Aug. 14, 1951
J. V. MARR ET AL
2,564,490
FILING MACHINE
Filed April 2, 1947
2 Sheets-Sheet 1
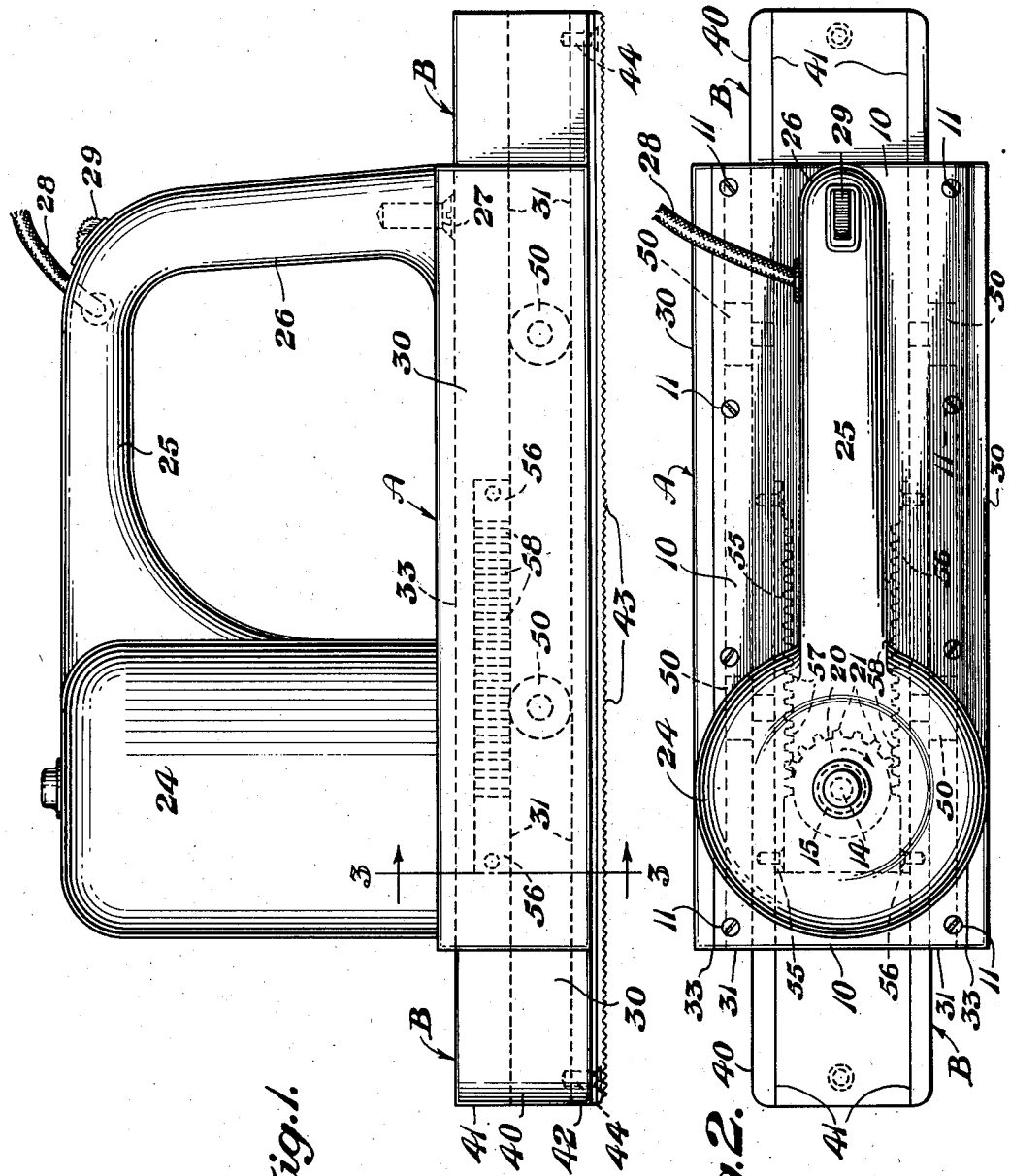
Inventors
John V. Marr and
William G. Mercer
By H. G. Lombard
Attorney Aug. 14, 1951   J. V. MARR ET AL   2,564,490
FILING MACHINE
Filed April 2, 1947   2 Sheets-Sheet 2

Inventors
John V. Marr and
William G. Mercer
H. G. Lombard
Attorney

Patented Aug. 14, 1951

2,564,490

UNITED STATES PATENT OFFICE 2,564,490

FILING MACHINE

John V. Marr and William G. Mercer, Fayetteville, N. C., assignors of twenty per cent to Carl A. Barrington, Fayetteville, N. C.

Application April 2, 1947, Serial No. 738,956

2 Claims. (Cl. 29—76)

This invention relates, in general, to improvements in portable, power driven machines for actuating various types of tools which are operated by a reciprocating motion, as in the use of a file or saw, for example.

More particularly, the invention is directed to an improved construction of a portable, power driven machine which is designed to reciprocate an elongate tool such as file, or the like, in the same general manner in which the tool would be operated by hand, but at considerably greater speed and uniformity in the working stroke thereof.

A primary object of the invention is to provide an improved, portable power driven machine of this character in a relatively compact and simplified design through the use of a highly efficient rack and gear actuating mechanism which imparts a constant and uniform working stroke to the tool in both directions of reciprocation thereof.

A further object of the invention is to provide a portable, power driven filing machine, or the like, embodying such a rack and gear actuating mechanism in combination with a body member mounted for reciprocation on anti-friction means which ensures smooth, even and uniform operation of the tool at comparatively high speed.

Another object of the invention is for the provision of a portable, power driven machine of the kind described which involves relatively few parts in the highly simplified construction thereof, and accordingly, is admirably suited for manufacture at comparatively low cost.

Further objects and advantages of the invention, and other new and useful features in the construction, arrangement and general combination of parts will be readily apparent as the following description proceeds with reference to the accompanying drawings, for purposes of illustration but not of limitation, in which like reference characters designate like parts throughout, and in which:

Fig. 1 is a side elevation view of the improved tool operating machine in accordance with the invention;

Fig. 2 is a top plan of the machine as shown in Fig. 1;

Figure 3:
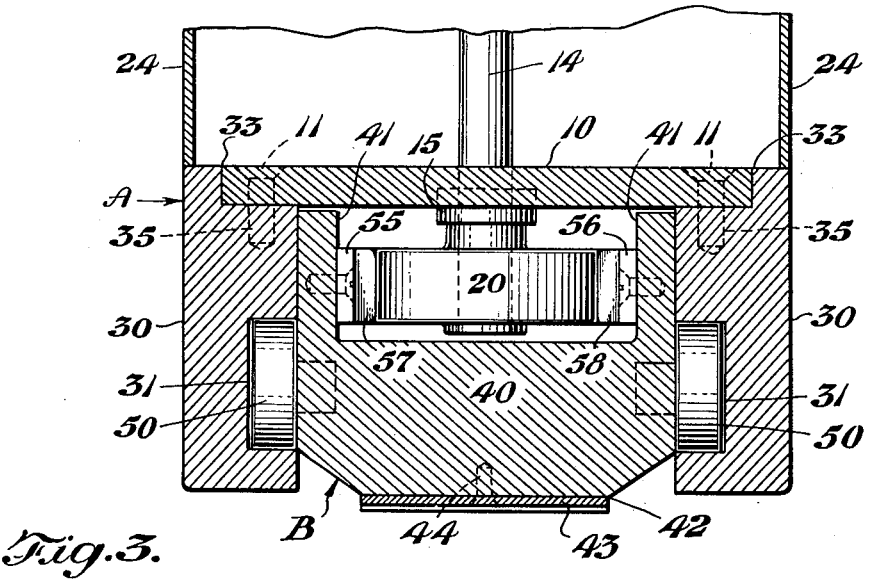
Figure 4:
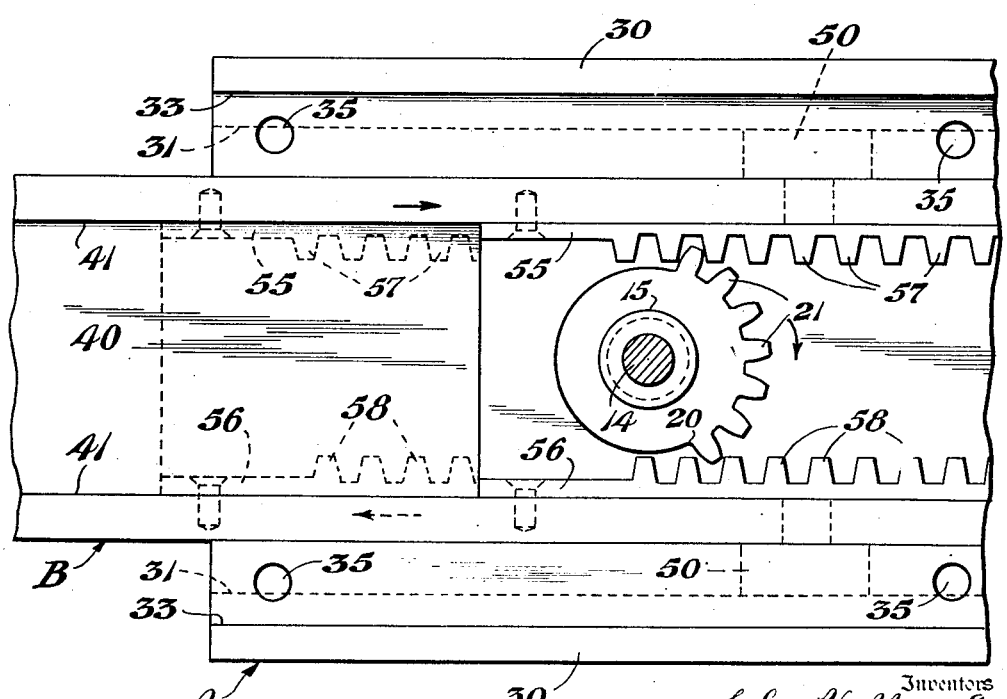

Fig. 3 is an enlarged sectional view of Fig. 1 taken on line 3—3, looking in the direction of the arrows; and, Fig. 4 is an enlarged, fragmentary top plan view of the machine with the motor casing and base plate removed to disclose the rack and gear actuating mechanism, said rack mechanism being shown in the retracted position of the reciprocating carriage or tool carrier and with the relative forward movement thereof indicated substantially as represented in broken lines.

Referring now, more particularly, to the drawings, Figs. 1 and 2 show the improved tool operating machine of the invention as constructed in a portable power driven apparatus adapted to impart a reciprocating motion to a tool element such as a file, rasp, or the like, in close simulation to the movements of a hand operated filing implement but at considerably greater speed and uniformity in the working stroke thereof. The machine comprises, in general, a body designated generally A and a reciprocable carriage or tool carrier designated generally B which is mounted in said body for reciprocation relative thereto.

As illustrated in Figures 2 and 3, the machine body A comprises a generally rectangular base plate 10 secured along its longitudinal edges by screws or stud bolts 11 to the upper surfaces of spaced, parallel side plates 30 to define an inverted, generally channel-shaped housing within which the tool carrier or carriage B is mounted for reciprocating movement longitudinally of the machine body. The base plate 10 and the mechanism carried thereby define a subassembly unit which is removably secured to the side plates 30 by said fasteners 11. This unit comprises a rotary motor shaft 14 extending vertically through an opening in the base plate 10 and supported relative thereto by a thrust bearing 15 secured by a press fit in a countersunk opening in said base plate. A segmental drive gear 20, Figures 2, 3, and 4, having a predetermined number of teeth 21 on a portion only of its periphery is keyed or otherwise fixedly connected in any suitable manner to the lower end of the rotary shaft 14 below the base plate 10. A hollow shell or casing 24 is supported above the base plate 10 in concentric relation to the shaft 14 and within said casing, an electric motor (not shown) is provided to drive said rotary shaft 14.

A handle, Figures 1 and 2, is mounted on said base plate 10 and is preferably in the form of a horizontal arm 25 combined with a vertical arm 26 which is secured to the base plate in any desired manner as by a stud bolt 27, Figure 1. The horizontal arm 25 of the handle is united to the motor casing 24 in any suitable way and is provided with a longitudinal bore receiving an electrical wire conduit 28 leading to the motor within the casing 24, and adapted to be connected to a source of power. The wire conduit 28, accordingly, is concealed and protected within the handle arm 25 in a manner which minimizes the possibility of damage or injury thereto in the handling or operation of the machine. A switch 29 is so provided that it may be conveniently operated by the thumb of the operator as the vertical handle 26 is held during the operation and use of the machine. The handle of this character otherwise is advantageous in that the horizontal arm 25 provides a convenient means for transporting the machine and also, for exerting pressure thereon most effectively in a direction generally normal to the work surface operated upon by the machine.

The described unit carried by the base plate 10, accordingly, is admirably suited for ready attachment to the spaced, parallel side plates 30 by the screws 11 in a relatively quick and easy assembling operation. The said side plates 30 are of relatively sturdy construction and have substantially the same dimensions and configuration. The inner faces of these plates are provided with longitudinal slots or grooves 31, Figure 3, defining parallel guideways or trackways for anti-friction rollers, or the like, which mount the associated carriage or tool carrier B in the completed machine. The upper surfaces of the side plates 30 preferably are rabbeted to provide longitudinal recesses 33 for receiving the opposing longitudinal edge portions of the base plate 10 which are secured by the screws 11 threaded into tapped bolt holes 35, Figure 4, provided in said side plates. The described rabbeted joint connection of the base plate 10 to the side plates 30 provides the same with the maximum strength necessary to withstand any lateral thrust or other force which might possibly tend to distort the spaced side plates 30 from their proper parallel spaced relation in the assembled machine body. To this end, as many bolts or screws 11 as are necessary or desirable may be employed to secure the side plates 30 to the base plate 10 with the required strength and rigidity, depending on the size of the filing machine and the nature of the work to be performed thereby.

The carriage or tool carrier B is an elongate, generally channel-shaped member 40 which is of a width substantially equal to the space between the spaced side plates 30 and which defines upstanding spaced side flanges or walls 41. The lower central area of this member forms a blade holding portion 42 comprising a flat bearing surface to which there is secured a file, rasp or other tool 43 by stud bolts or screw 44 applied through countersunk openings in the ends of said tool, substantially as shown in Figure 1. The arrangement is such that the file 43 or other tool is supported in downwardly projecting relation to the lower surfaces of the side plates 30 with the adjacent longitudinal edges of the blade holder 42 being bevelled outwardly and upwardly from said tool 43, as shown in Figure 3.

On the outer side faces of the carriage 40, there are mounted two or more pairs of antifriction rollers 50 having a diameter and width approximating the size of the trackways 31 in the side walls 30. These antifriction rollers preferably include ball bearings for maximum efficiency and are mounted to the carriage 40 in any suitable way as by pintles secured by a drive fit in holes bored into the sides of the carriage member 40.

The spaced side flanges 41 of the carriage 40 extend upwardly into the machine body A between the side plates 30 in position to receive in the space therebetween the segmental drive gear 20 on the rotary shaft 14. On the inner faces of said flanges 41, toothed racks 55, 56 are secured thereto in any expedient manner as by screws applied through passages in the ends of the racks. Said toothed racks 55, 56, are thus oppositely disposed on the side flanges 41 such that the teeth thereon, 57 and 58, respectively, are adapted alternately to mesh with the teeth 21 on the segmental drive gear 20 during rotation of said drive gear in the operation of the machine, as presently to be described.

With the various parts of the machine provided substantially in the manner described, it will be understood, that the machine is easily and quickly assembled simply by positioning the side plates 30, Fig. 3, on either side of the carriage or blade holder 40 with the antifriction rollers 50 received in the trackways 31 in said side plates. After such assembly of the blade holder 40 and side plates 30, the side plates are held in spaced parallel relation directly opposite each other, whereupon the previously described subassembly unit carried by the base plate 10 is assembled therewith by seating said base plate in the rabbeted recesses 33 in the upper surfaces of the side plates 30. As the base plate is lowered into such position, the segmental gear 20 is received between the opposing toothed racks 55, 56 in operative relation thereto substantially as shown in Figures 2–4 inclusive. The stud bolts or screws 11 are then applied to the tapped holes 35, Figures 3 and 4, in the side plates 30 to secure the same to the base plate 10 in completing the assembly of the machine in a minimum of time and assembling operations.

In operation, it will be apparent that when the switch 29 is turned on to supply electric current the motor within the casing 24, the motor shaft 14 rotates the segmental gear 20 fixed thereto in a clockwise direction, as indicated by the curved arrow in Figure 4. As said gear 20 rotates, the teeth 21 thereon alternately mesh with the teeth 57 and 58 on the respective toothed racks 55 and 56, Figures 2 and 4, to reciprocate the carriage or tool carrier 40 relative to the machine body A. Referring to Figure 4, it will be understood that in the present illustration, the tool carrier or carriage 40 is represented as substantially fully retracted relative to the machine body A. In this relation, the segmental gear 20 is in more or less neutral position with the teeth 21 thereon just about to disengage from the teeth 57 on rack 55 and to mesh with the teeth 58 on rack 56. Clockwise rotation of the gear 20 from the position shown in Figure 4, accordingly, causes the teeth 21 thereon to engage said teeth 58 and cause the rack 56 to travel to the left, as indicated by the lower arrow in Figure 4, substantially to the position represented in broken lines. The tool carrier 40 to which said rack 56 is secured is thereby actuated in its forward stroke. At the end of such forward stroke, the teeth 21 on gear 20 are thereupon disposed in position to engage with the teeth 57 on rack 55 to effect the rearward movement of the tool carrier 40. This takes place upon further clockwise rotation of the gear 20 to cause the teeth 21 thereon to mesh with the adjacent teeth 57 on rack 55 beginning with those teeth at the rear end of said rack. The rack 55 is thereby caused to travel to the right, as indicated by the upper arrow in Figure 4, thus actuating the tool carrier 40 in its rearward or return stroke. The position of the racks 55, 56 at the limit of such return stroke is substantially as represented in full lines, in which relation the tool carrier is substantially fully retracted, and thus set for further reciprocations forwardly and thence rearwardly in a continuous repetition of the foregoing described cycle of the operation of the machine.

It will be appreciated that the novel driving means comprising the opposed racks and segmental gear actuating mechanism enables the machine to operate at relatively high speed in providing a rapid reciprocation of the tool carrier 40 which imparts the desired reciprocation to the file 43, rasp or other tool attached to said tool carrier. The reciprocating movement of the tool is constant and uniform in both its forward and rearward strokes and consequently by the use of the present invention, a work surface can be quickly treated with exceptionally fine results and by a minimum of effort on the part of the operator of the machine. To this end, the antifriction rollers 50 which are positioned in the trackways 31 to support the tool carrier 40 in the machine, reduce to a minimum the friction and drag taking place in the reciprocating movement of the tool carrier 40 within the machine body, particularly when pressure is placed upon the machine to force the file or other tool firmly against a work surface. The operator, therefore, is required to exert relatively little pressure on the handle arms 25, 26 in pushing the machine against the surface being treated.

An inherent advantage of the invention is the comparatively light weight construction of the machine such that it is easily portable and readily manipulated on a work surface.

A further advantage resides in the highly simplified and compact structure of the machine and the minimum number of parts required in the construction thereof which makes possible the economical quantity production of the machine at relatively low cost.

While the invention has been described in detail with a specific example, such example is intended as an illustration only, since it will be apparent to those skilled in the art that other modifications in the construction, arrangement and general combination of parts may be devised without departing from the spirit and scope of the invention. The present embodiment is therefore to be considered in all respects as illustrative and not restrictive, the scope of the invention being indicated by the appended claims rather than by the foregoing description, with all changes falling within the scope, meaning and range of equivalency of the claims intended to be embraced therein.

What is claimed and desired to be secured by United States Letter Patent is:

1. In a tool of the class described, a generally channel-shaped body defining a base and spaced side plates extending downwardly from said base, said side plates having longitudinally extending trackways on the inner faces thereof, a carriage within said generally channel-shaped body comprising a tool carrier surface and spaced upstanding flanges in parallel relation to said downwardly extending side plates of the tool body and having spaced inner walls, opposed toothed racks on said spaced inner walls of said upstanding flanges, antifriction rollers mounted on the outer sides of said carriage and received in said trackways in said side plates of the tool body to support said carriage in said tool body, a motor carried by said base of the tool body, a rotary shaft driven by said motor, a segmental gear secured to said shaft below said base and positioned between said opposed toothed racks, said segmental gear being rotatable by said shaft to mesh alternately with said opposed toothed racks for imparting successive opposite movements to said carriage.

2. In a tool of the class described, a generally channel-shaped body defining a base plate and spaced side plates secured to said base plate and extending downwardly therefrom, said side plates having longitudinally extending trackways on the inner faces thereof, a carriage within said generally channel-shaped body comprising a tool carrier surface and spaced upstanding flanges in parallel relation to said downwardly extending side plates of the tool body and having spaced inner walls, opposed toothed racks on said spaced inner walls of said upstanding flanges, antifriction rollers mounted on the outer sides of said carriage and received in said trackways in said side plates of the tool body to support said carriage in the tool body, a motor carried by said base plate of the tool body, a casing for said motor and a handle connected to said casing, a rotary shaft driven by said motor extending through an opening in said base plate in vertical relation thereto, a bearing supporting the shaft in said base plate opening, a segmental gear secured to said shaft below said base plate and positioned between said opposed toothed racks, said segmental gear being rotatable by said shaft to mesh alternately with said opposed toothed racks for imparting successive opposite movements to said carriage.

JOHN V. MARR.
WILLIAM G. MERCER.

REFERENCES CITED

The following references are of record in the file of this patent:

UNITED STATES PATENTS

| Number | Name | Date |
|---|---|---|
| 458,302 | Koch | Aug. 25, 1891 |
| 707,112 | Horrocks | Aug. 19, 1902 |
| 1,531,779 | Gazo | Mar. 31, 1925 |
| 1,873,011 | Modglin | Aug. 23, 1932 |
| 2,103,444 | Bauch | Dec. 28, 1937 |
| 2,354,616 | Thrailkill | Aug. 1, 1944 |